June 27, 1933.   C. S. SOUDERS   1,915,767
LOCK NUT
Filed May 5, 1932
Fig.1.
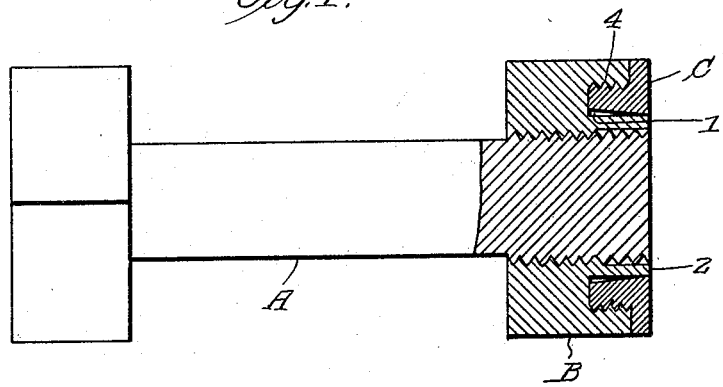
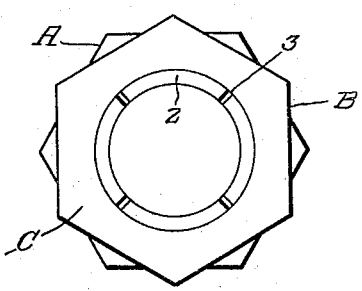
Fig.2.
Inventor
Clifford S. Souders,
By Clarence A. O'Brien
Attorney Patented June 27, 1933

1,915,767

UNITED STATES PATENT OFFICE

CLIFFORD S. SOUDERS, OF CHRISTIANA, PENNSYLVANIA

LOCK NUT

Application filed May 5, 1932. Serial No. 609,478.

This invention relates to a lock nut, the general object of the invention being to provide locking means located in a nut for locking the nut to the bolt.

This invention also consists in certain other features of construction and in the combination and arrangement of the several parts to be hereinafter fully described, illustrated in the accompanying drawing and specifically pointed out in the appended claim.

In describing the invention in detail reference will be had to the accompanying drawing wherein like characters denote like or corresponding parts throughout the several views, and in which:—

Figure 1 is an elevation with parts in section showing the improved locking nut on the bolt.

Fig. 2 is an end view looking towards the nut.

In these views, the letter A indicates the bolt and the letter B the nut. The outer face of the nut is formed with an annular groove 1 which is spaced from the bore of the nut so as to leave a thin wall of metal 2 which is provided with the slits 3 so as to divide this wall into slightly resilient sections. The outer wall of the groove is threaded and lower than the wall 2 and a locking member C has an annular portion extending into the groove and externally threaded to cooperate with said threaded wall. The inner portion of the locking member is tapered so as to compress the slitted sections of said thin wall 2 against the bolt. The locking member C has a laterally extending flange on its outer part which extends over the outer wall of the groove when the member is threaded in the groove and the exterior configuration of said flange is equal to the exterior configuration of the nut. The thickness of said flange is equal to the difference between the heights of said inner and outer walls of the groove, so that when said flange abuts the top of the outer wall of said groove, the outer face of the locking member will be flush with the top of said thin wall.

Thus this invention provides a nut which will resist loosening from jars and vibrations and a simple tool can be used for adjustment of the nut and its member C, and the device will not injure either the threads of the bolt or the nut, and can be easily and quickly put in place on a bolt or removed therefrom.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention what I claim as new is:—

In combination; a nut having an annular groove in its outer face disposed so as to provide an inner wall spaced from the bore of the nut a distance to provide a relatively thin wall, said wall having slits therein, the outer wall of said groove being threaded and lower than said inner wall; and a locking member having an annular portion extending into said annular groove in the nut and externally threaded to cooperate with said threaded wall, the inner portion of said locking member being tapered so as to compress the slitted sections of said thin wall against a bolt on which said nut is threaded, a laterally extending flange on the upper part of said locking member extending over the outer wall of said groove and having an exterior configuration equal to the exterior configuration of the nut, the thickness of said flange being equal to the difference between the heights of said inner and outer walls of said groove, so that when said flange abuts the top of the outer wall of said groove, the outer face of the locking member will be flush with the top of said thin wall.

In testimony whereof I affix my signature.

CLIFFORD S. SOUDERS.